(12) United States Patent
Reithmayer et al.

(10) Patent No.: US 8,378,526 B2
(45) Date of Patent: Feb. 19, 2013

(54) ELECTRONIC SECURITY FOR A POWER SUPPLY

(75) Inventors: Franz Reithmayer, Vienna (AT); Harald Schweigert, Vienna (AT)

(73) Assignee: Siemens Aktiengesellschaft, München (DE)

( * ) Notice: Subject to any disclaimer, the term of this patent is extended or adjusted under 35 U.S.C. 154(b) by 128 days.

(21) Appl. No.: 12/527,253

(22) PCT Filed: Jan. 17, 2008

(86) PCT No.: PCT/EP2008/050523
§ 371 (c)(1),
(2), (4) Date: Aug. 14, 2009

(87) PCT Pub. No.: WO2008/098813
PCT Pub. Date: Aug. 21, 2008

(65) Prior Publication Data
US 2010/0117458 A1    May 13, 2010

(30) Foreign Application Priority Data
Feb. 16, 2007 (AT) .................................. A 246/2007

(51) Int. Cl.
*H01H 47/00* (2006.01)
(52) U.S. Cl. ....................................................... 307/126
(58) Field of Classification Search .................... 307/126
See application file for complete search history.

(56) References Cited

U.S. PATENT DOCUMENTS

| | | | | |
|---|---|---|---|---|
| 5,973,416 A | * | 10/1999 | Guenther | 307/125 |
| 7,499,252 B2 | * | 3/2009 | Raimondi et al. | 361/93.1 |
| 7,558,093 B1 | * | 7/2009 | Zheng | 363/97 |
| 7,564,667 B2 | * | 7/2009 | Veroni | 361/93.1 |
| 2006/0158160 A1 | * | 7/2006 | Friedrich | 323/222 |
| 2006/0164776 A1 | | 7/2006 | Erdl | |
| 2006/0261838 A1 | | 11/2006 | Hackner | |

FOREIGN PATENT DOCUMENTS

| | | |
|---|---|---|
| DE | 102005002359 A1 | 7/2006 |
| EP | 1236257 B1 | 2/2004 |
| EP | 1487077 A2 | 12/2004 |
| RU | 2310878 C1 | 11/2007 |
| WO | WO 0141277 A2 | 6/2001 |
| WO | WO 02082611 | 10/2002 |

(Continued)

OTHER PUBLICATIONS

Veit Friederichs;Peter Hockamp; Terence Osborn; Karin Weber: "Lexikon Schaltgeräte und Automatisierung" Apr. 30, 1996, Klöckner-Moeller GmbH, XP002483449, pp. 11, 15, 123.

(Continued)

*Primary Examiner* — Robert L. Deberadinis

(57) ABSTRACT

A security circuit for a power supply feeding a DC system is provided. The security circuit is disposed on an outlet of the power supply. A switch element is disposed between a positive power supply clamp and a positive output clamp towards the DC system. A choke coil is disposed between the switch element and the positive output clamp. The choke coil is connected to an output capacitor on a side connected to the positive output clamp, and a side of the choke coil that is connected to the switch element is connected to a cathode side of a diode that is connected in parallel to the output capacitor. The security circuit also includes a control for the switch element, connecting the switch element in accordance with the power measured in the security circuit.

14 Claims, 3 Drawing Sheets

FOREIGN PATENT DOCUMENTS

WO  WO 2005052610 A1  6/2005

OTHER PUBLICATIONS

"Reducing ground bounce in dc/dc-converter applications" Jeff Barrow, Electronic Design News (EDN), Jul. 6, 2006, Seiten 73-78, XP002483448, pp. 73-78.

Communication from china Patent Agent (H.K.) Ltd., Aug. 29, 2011, pp. 1-3, 1-4.

Veit Friederichs; Peter Hockamp; Terence Osborn; Karin Weber: "Lexikon Schaltgeräte und Automatisierung" Apr. 30, 1996, Klöckner-Moeller GmbH, XP002483449, Seite 11, 15, 123.; Others.

"Reducing ground bounce in dc/dc-converter applications" Jeff Barrow, Electronic Design News (EDN), Jul. 6, 2006, Seiten 73-78, XP002483448, Seite 73-Seite 78; Others.

* cited by examiner

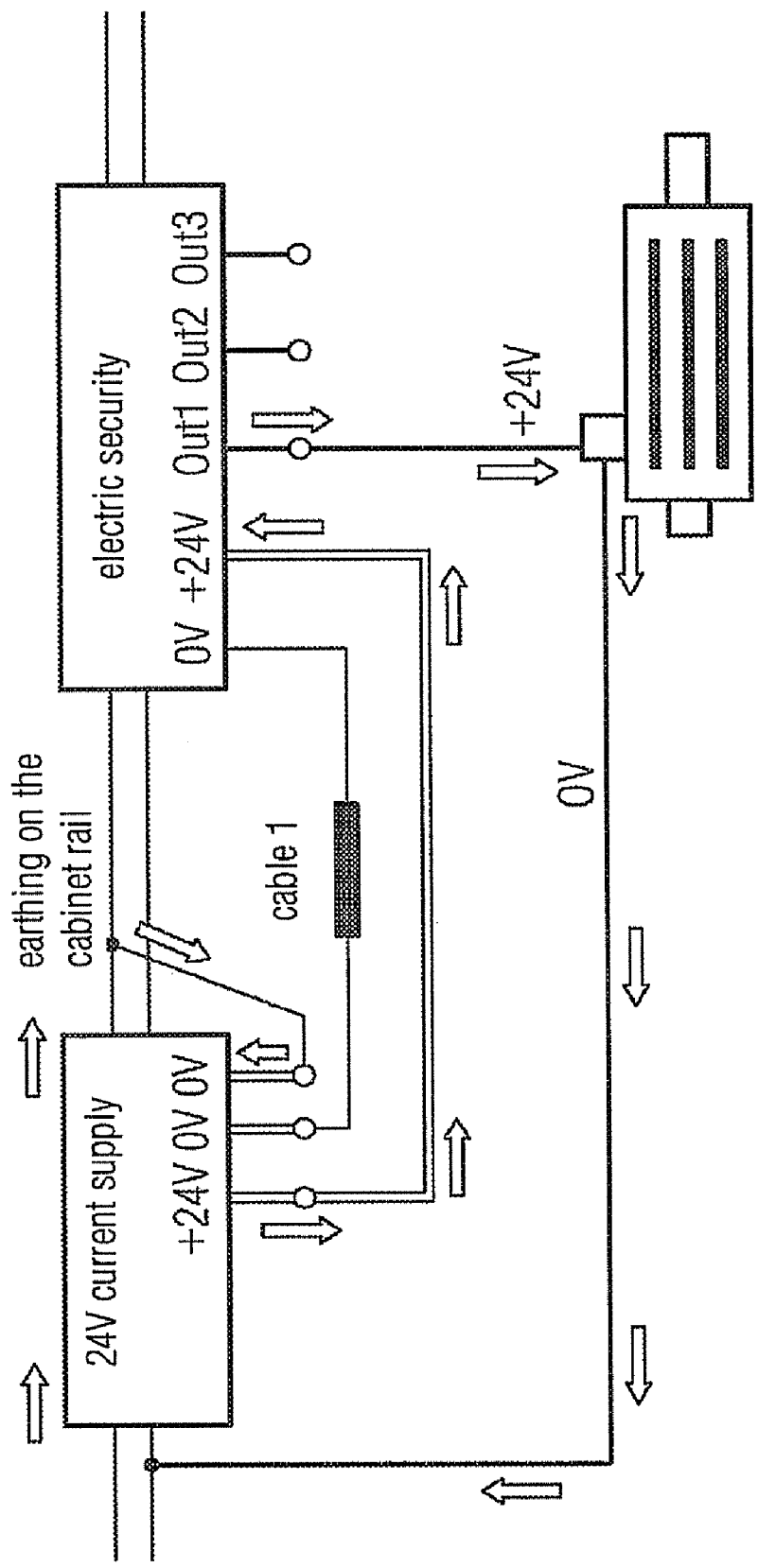

ents*

ELECTRONIC SECURITY FOR A POWER SUPPLY

CROSS REFERENCE TO RELATED APPLICATIONS

This application is the U.S. National Stage of International Application No. PCT/EP2008/050523 filed Jan. 17, 2008, and claims the benefit thereof. The International Application claims the benefits of Austrian Patent Application No. A 246/2007 AT filed Feb. 16, 2007; both of the applications are incorporated by reference herein in their entirety.

FIELD OF INVENTION

The invention relates to a security circuit for a power supply feeding a DC system.

BACKGROUND OF INVENTION

With switched-mode power supplies a current limiter is almost always incorporated along with the power semiconductor and the coils to provide protection. The consequence of this current limiter is that, when the output power is divided up into a number of arms for protection with a fuse or with an automatic cutout the trip current needed cannot be delivered in the event of a short circuit. Electronic security cutouts with a precise overload characteristic curve and precise tripping current are already available. These circuits are expensive however since with a heavy load a very large amount of leakage power is built up in the switch elements of the security cutout.

It has thus been suggested in the prior art for example to restrict the loads to such types as draw only small start-up overcurrents, and thus remain below the pulse leakage power of the current-limited switches which operate during the start-up phase in linear mode. The mostly pulse-shaped linear operating phases (5 to 200 ms) mean that the leakage power cannot be dissipated from the transistor quickly enough, so that its thermal capacity must exclusively accept the leakage power. A silicon chip with a thickness of around 100 µm used and a surface of a few square millimeters can thus only accept energy to a very limited extent.

It has thus also been proposed in the prior art to also relocate leakage power to an additional resistor, which is controlled via a separate transistor and thus make a significantly greater mass available for energy acceptance. Because of the requirement to implement any given security cutout setting values (adjustable security cutout), in the case of the highest leakage power occurring, only 75% of the energy can be accepted by the resistor. The transistors must thus be able to cover the remaining 25% with their thermal capacity. Such a circuit arrangement is known from WO 02/082611.

A number of power resistors and an electronic switch in series in each case enable an overall resistance between load and supply source to be achieved with the corresponding graduation by selecting the right combination of transistors switched on and switched off, so that the load current does not exceed predeterminable limits.

SUMMARY OF INVENTION

In principle the problem confronting all existing electronic security cutouts is that they are installed at an unknown distance from the feeding power supply. This means that the design of the security cutout must take this into account and when loads are connected the current in the load increases. The active aim must lie in the positive line (e.g. +24V) and the 0V connection of the load must be made via spatially fully separate paths, as with loads in an automobile for example, which are connected via the bodywork to ground, where likewise only the +12V line is switched. Since the 0V connection of the load is never routed to the point of the cutout, clocking circuits are not possible. A pulsing current would flow via the 0V connection of the overall system, which would lead to ground bounce and faults in modules and loads.

A further problem arises during the connection of heavy loads, such as the charging up of load capacitors for example (e.g. input part of DC/DC converter) or motors that start up slowly. The problem arises from the fact that in industrial controllers a plurality of loads are used on the 24V control voltage (such as magnetic valves, processor modules with own DC/DC converters, capacitors which are connected in the discharged state, DC motors which start up, incandescent lamps the filaments of which must first heat up etc.). Many of these loads have the characteristic of briefly drawing a higher current than the rated current when switched on. The use of switched-mode power supplies means that the negative aspect of these components likewise emerges. The modules are barely able to deliver brief appreciable overcurrents in the output. When the rated currents of the power supplies are exceeded the current limiting cuts in almost without delay and as a consequence the output voltage falls. This means that generally the entire control system "crashes". If there is a desire to continue to use switched-mode power supplies, the only option is to limit the current in the individual loads to a value which lies only slightly above the power consumption which was planned for this load in the system planning. In this case as a rule the power of the switched-mode power supplies is selected in the system planning on the basis of the sum of the individual consumers (loads) to be expected and on their simultaneous occurrence and the power supply type is selected accordingly The fact that the maximum current is limited in a load, which if necessary lies only slightly above the rated current and thus within the projected overall energy consumption of the system results in a slower startup of these loads. Thus a motor might accelerate more slowly, a capacitor charge more slowly, an incandescent lap light more dimly etc.). These delays are in most cases not critical to system functions, but must be taken into account by the system planner. An obvious major advantage is that the supply of control voltage (e.g. 24V) no longer collapses when a consumer is connected in and the system does not crash.

This soft startup requires that the differential energy between the feeding source and the product of current and load voltage accepted by the load must fall at the switch element. When a capacitor is charged for example the result is that in the first instant this represents a short circuit and the product of voltage and current set must fall entirely at the switch element. This can be a resistance or better a variable resistance, or a semiconductor which operates like a variable resistance. With corresponding large capacitors the energy to be converted into heat in the switch element (or resistor) can become very large and soon exceeds the capabilities of a transistor.

It is thus an objective of the invention to implement a security circuit for a power supply feeding a DC system that avoids these disadvantages, and especially represents a low-cost option for executing an electronic security cutout in the DC output circuit of a regulated power supply.

This objective is achieved by a security circuit, a circuit arrangement and a method as claimed in the claims. A security circuit for a power supply feeding a DC system is provided, wherein it is proposed that the security circuit be disposed at the outlet of the power supply and that a switching element be provided between the positive power supply terminal and the positive output terminal towards the DC system, as well as a choke connected between the switch element and the positive output terminal, with the choke being connected on its side connected to the positive output terminal to an output capacitor and the side of the choke connected to the switch element being connected to a diode switched in parallel to the output capacitor, as well as a control being provided for the switch element which switches the switch element as a function of current measured in the security circuit.

Such a circuit arrangement is also known as a buck converter. By using an inventive arrangement of the proposed security circuit directly at the outlet of the feeding source (e.g. a 24V power supply) the problem of switching on heavy loads, such as charging of load capacitors (input section of Dc/DC converters) or motors which are slow to start up can be solved with a very much lower overall outlay in components. By using an inventive circuit arrangement the conversion of the overall difference energy between feeding source and load is not necessary. It is however necessary either to integrate the inventive security circuit in the power supply or at least to install it so close to the power supply that the same electrical conditions are provided.

With the inventive circuit the advantage is that by integrating one or more buck converters directly at the outlet of a feeding power supply faults in the system to be supplied can be prevented. Each switched-mode buck converter needs a stable supply voltage in such cases, preferably supported by means of a capacitor in order to be able to remove the operationally-related necessary pulse streams. In this case the switching transistor frequently interrupts the power feed from the feeding source in order to give the magnetized choke the opportunity to reduce its current again. In this case the choke with its current fluctuates around the value of the output current. The peak-to-peak value of the varying current is called ripple, the mean value of the choke current is ultimately the output direct current.

The diode connected to the choke provides an automatic protection against negative voltages when switching off large inductive loads or when switching off the feeding power supply.

The security circuit can be integrated into the housing of the power supply, with in this case the input capacitor of the security circuit also being able to represent the output capacitor of the power supply. In this way one component can be saved.

Alternatively, the security circuit can be embodied as a separate module for direct connection to the power supply. The inventive circuit arrangement can in this way also function as a power distributor.

There is provision for the security circuit to be embodied as a separate module for a connection to the power supply remote from the power supply, with a separate 0V line being provided as a feedback to the power supply and filters for smoothing pulse streams being provided close to the security circuit. Suitable filters for smoothing pulse streams are known in the prior art.

The switch element is controlled via a microprocessor. In this case a signal can also be sent from the control computer at regular intervals, as will be explained in greater detail below, which notifies to the individual outputs the respective valid current-limiting value. In this case when the power supply is replaced, in the event of a defect for example, automatic adjustment can be undertaken simply by entering the device address.

As an alternative to using a choke, a simple resistor is used. Once again the security circuit is disposed at the output of the power supply, with the resistor being connected between the positive power supply terminal and the positive output terminal towards the DC system in series with the switch element. The resistor is furthermore connected on its side connected to the positive output terminal at an output capacitor. Furthermore a control is again provided for the switch element which switches the switch element as a function of the current measured in the security circuit. This embodiment, although also suitable as a security circuit within the context of the invention, does not however represent the preferred variant.

A circuit arrangement with a power supply feeding a DC system and at least two security circuits with at least two positive output terminals as output channels is also provided.

Thus a number of outputs, which are also referred to below as output channels, can be integrated into a housing which is thus fed from the same power source. In this case when switching on the output channels for example, synchronization can be provided in order to reduce the loading in the input capacitor for the security circuit which will correspond to the output capacitor of the power supply and thus also to the general ripple at the outlet of the feeding power supply.

There can be provision for inputs to be provided for activation and deactivation of the output channels. This makes it possible to use an electronic relay.

For the case of a number of output channels, there can also be provision for a single microprocessor to be provided for controlling the switch elements of the at least two security circuits.

An analog circuit for controlling the switch elements of the at least two security circuits is provided. The use of an analog circuit for controlling the switch elements is also possible when only one channel is provided.

There is provision for integration of power semiconductors and the control of a circuit in a power ASIC.

A hybrid circuit is provided which comprises power semiconductors and a buck converter coil and preferably can be manufactured and fitted as a module.

The invention further relates to a method for controlling a security circuit, with a rated current value being predetermined and the switch element only being actuated after a predetermined duration during which the rated current value is exceeded in the security circuit. A current value which exceeds the rated current value is referred to as an overcurrent. The time until the actuation of the switch element and thus until the triggering of the security circuit depends on by how much the predetermined rated current value is exceeded. This time can also be made dependent on how large the overcurrent is in relation to the rated current value and can be all the longer the lower the overcurrent is in relation to the rated current value.

The actuation of the switch element on triggering the security circuit can also be made dependent on the thermal situation of the power semiconductors and other components in the current path. In this case time values can be computed either by measuring the temperature or by measuring only the ambient temperature and the power curve history.

There is provision for a current limitation value exceeding the rated current value to be additionally predetermined and after a predetermined time for which the current-limiting value is exceeded in the security circuit, for the output terminal assigned to it to be deactivated. The duration of the limited current value can in its turn be made dependent on the predetermined rated current value and might be longer the smaller the rated current value is. Once again the actuation of the switch element for triggering the security circuit can also be made dependent on the thermal situation of the power semiconductors and other components in the current path.

When the input voltage of a security circuit is not reached, the output terminal assigned to it is deactivated. Thus when the input voltage of a security circuit is not reached, which corresponds to the output voltage of the feeding power supply, the corresponding overloaded output is switched off, i.e. that output of which the load overloads the power supply by overcurrent such that this goes into current-limiting mode and thereby its output voltage falls. The power supply thus goes back into normal mode and supplies, by for example realizing a number of outputs the rated voltage again. For linear regulators such a system is already described in EP 1 236 257.

Finally, a use of a buck converter as a current-limiting security circuit at the output of a power supply feeding a DC system is provided.

BRIEF DESCRIPTION OF THE DRAWINGS

The invention will be explained in greater detail below on the basis of an exemplary embodiment with the aid of the enclosed figures, in which

FIG. 4 shows a typical system structure when an inventive security circuit is used.

DETAILED DESCRIPTION OF INVENTION

Figure 1:
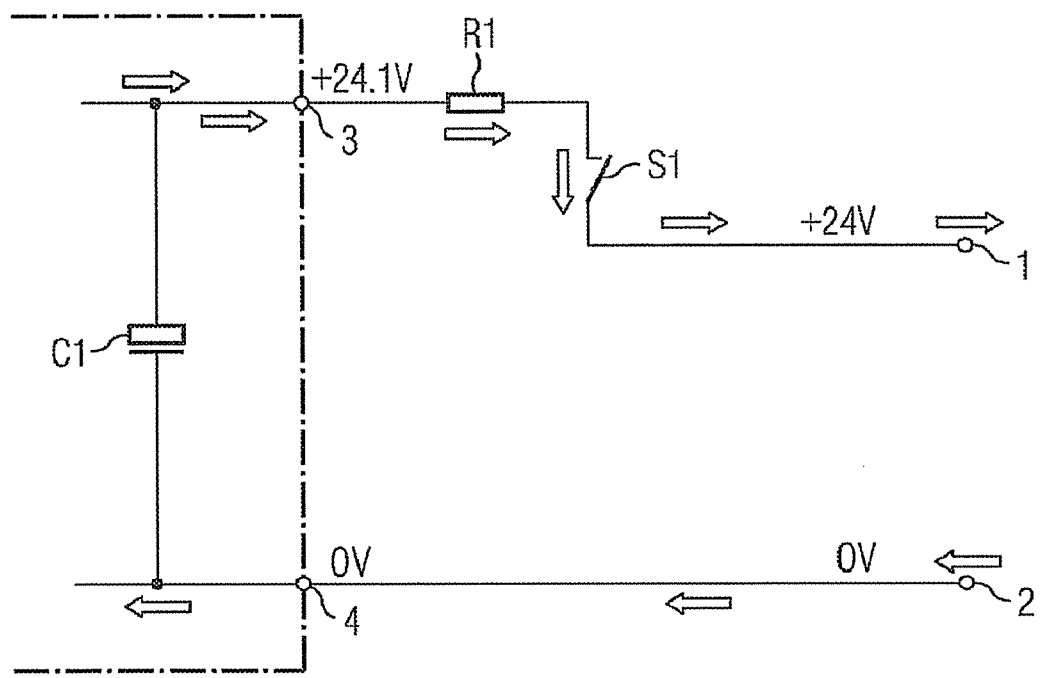
FIG. 1 shows a prior-art circuit arrangement.

A circuit arrangement according to the prior art with analog current limiting is shown in FIG. 1. On the left-hand side of FIG. 1 the power supply terminals 3, 4 can be seen and on the right-hand side the output terminals 1, 2. The output terminals 1, 2 are connected to the load-side DC system. A switch element S1 is provided as a current-limiting element, but this is not operated in switched mode. With current limiting the switch element S1 must go into a semi-through-connected state so that the between input voltage (+24.1V/0V) and load voltage (+24V/0V) is assumed. This produces a large leakage current at the switch element S1. The time limiting must thus be oriented to the thermal capacity of the switch element S1.

Figure 2:
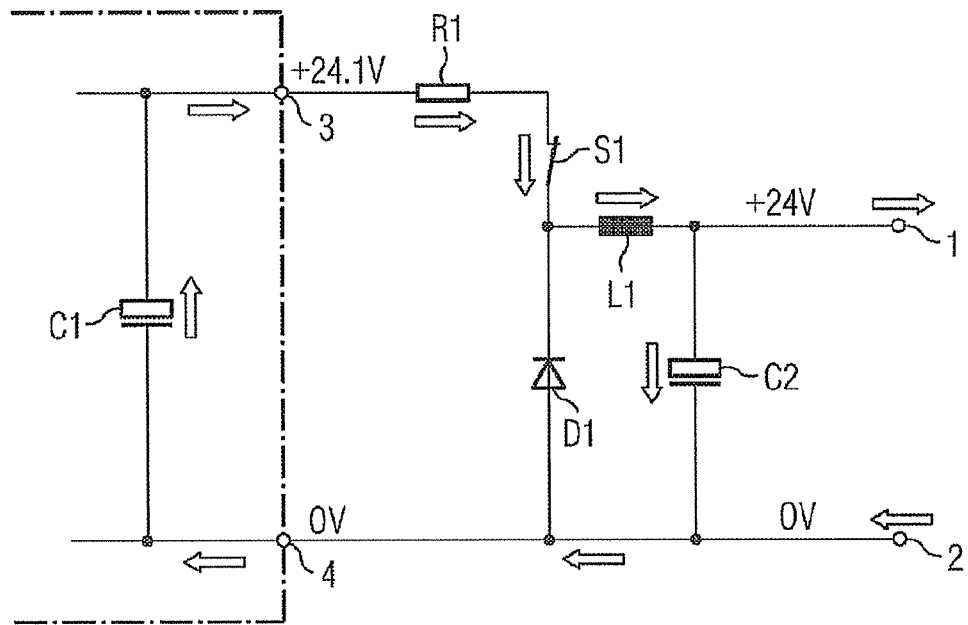
FIG. 2 shows a preferred embodiment of the inventive security circuit in that operating phase in which the switch element is closed.
Figure 3:
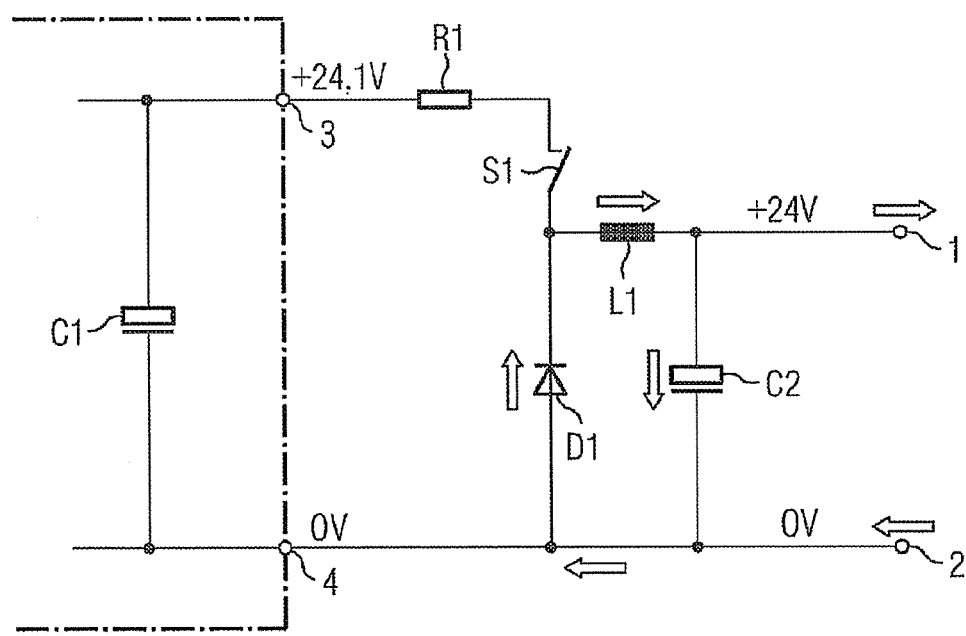
FIG. 3 shows the security circuit as depicted in FIG. 1 in that operating phase in which the switch element is open.

FIG. 2 by contrast shows a preferred embodiment of the inventive security circuit in that operating phase in which the switch element is closed. FIG. 3 shows the security circuit in that operating phase in which the switch element is opened. The inventive security circuit for a power supply feeding a DC system is disposed towards the outlet of the power supply. Provided between the positive power supply terminal 3 and the positive output terminal 1 for the DC system are a switch element S1 and also a choke provided between the switch element S1 and the positive output terminal 1, with the choke L1 on its side connected to the positive output terminal 1 being connected to an output capacitor C2. The side of the choke L1 connected to the switch element S1 is connected to the cathode side of a diode D1.

On activation of the positive output terminal 1 the switch element is moved from a switched-off state into a switched-mode state. By the slow increase in the pulse duty ratio up to the permanently switched-on state the current in the output can be determined. This current may be measured in resistor R1, which is operated as a shunt whereby, depending on the measured current, the duty ratio of S1 is influenced with the aid of a control (not shown in FIG. 1-4). The diode D1 is only designed for short term operation and thus does not normally have to be cooled. The switch element S1 will be a semiconductor switch, preferably a MOSFET. When MOSFETs are used, depending on the type used, the heat sink can also be omitted.

The switch element S1 is only in switched mode for a short time when switched on, which means that switching losses also only occur in this phase. Since in the interim very low-resistance transistors have already become available, a heat sink is no longer required for ambient temperatures of 60° C. and output currents of 10 A. Current is continuously flowing through the choke L1 so that the latter must be thermally able to conduct for the duration. However because of the short start-up phase of typically 50 to 500 ms it does not have to be able to dissipate the additional losses through operation with high frequencies over the long-term. The choke L1 can be embodied as an air-core reactor for the correspondingly high frequency which merely involves a winding without a core. Such a component is usually manufactured from copper lacquered wire. Because of the short-term operation a ferrite choke can alternately be equipped with a highly-permeable core even if this has high remagnetization losses. Noise-suppression chokes in bar-core or mushroom-core form are components of this type. These do not have a closed core since this results in simpler and better manufacturing. This enables smaller sizes and lower permanent conduction losses to be achieved, since the use of a ferrite core means that the number of wire windings will be far lower. The usual capacitor for supporting the power supply voltage at the input is omitted since this function is taken over by the output capacitor of the power supply which corresponds to the input capacitor C1 of the security circuit.

The current can be measured by a resistor R1 in the lead of the electronic fuse. Alternatively the resistor R1 can also be connected directly in the output line of the security circuit. This has the disadvantage that in the buck converter part uncontrollable currents flow at the moment of switch-on, since the output capacitor first has to be charged up before current can flow into the load. Instead of a shunt resistor the current can also be measured via a compensated DC converter, such as a Hall converter.

If an attempt is made to omit the resistor R1 completely, the voltage drop at the switch element S1 can also be measured. If a MOSFET is involved, an almost linear relationship of the current to the measurable voltage drop is produced. The temperature of the transistor has a massive influence on this relationship however. With a known transistor temperature the actual current (analog or digital) can be computed via the compensation circuit. The evaluation of the current becomes difficult at a high clock frequency of the switch element S1 however, since the lower measured values (during the switch-on time of the switch element S1) change at high frequency in relation to the full supply voltage (during the switch-off time of the switch element S1). The choke L1 represents a further alternative for current measurement and this is done with an RC element in parallel to choke L1 which features a time constant which is far greater than the period duration of the clock frequency in the case of current limiting or startup. This enables the ohmic voltage drop of choke L1 to be measured out and fed as a setpoint value to a controller. A dependency of the resistance of the choke L1 on the temperature is likewise produced here. If the temperature of the choke L1 is known then, as with measurement of the voltage drop of the transistor, a compensation can be undertaken. In addition the current can be measured in so-called sense FETs, these being MOSFETS which feature a separate current sensor output which can be evaluated.

The functioning of the inventive circuit arrangement is dealt with below. Initially the current is measured in resistor R1 and if it exceeds the rated current value the switch element S1 is opened. During the switch-off phase of the switch element S1 the choke L1 has the opportunity to reduce the current since it is delivering energy into the load. Since the current flow through the switch element S1 is interrupted, current also does not flow through the input capacitor C1 and the resistor R1. The input capacitor C1 must thus be in a position to deliver the current pulses. This is however only needed at the moment of current limitation of the output, such as during switch-on and thus charging up of the output capacitor C2 and the possible load capacitors at the output, as well as during operation in current-limiting mode. The current limiting is restricted in time and serves to avoid feedback as a result of the connection of modules when the system is running (so-called hot plugging) or the keeping away of overcurrent and thereby voltage drops on the supply rail (24.1V/0V).

At the beginning of the next period the switch element S1 is switched on again. A current ramp can now be predetermined during switching on which is intended to follow the current limiting. More simple and with unknown loads in the application more secure is the predetermining of a current ramp which is powered up while complying with the maximum current limit. With loads which occur suddenly such as DC/DC converters switching on, there will scarcely be any intrusion of the output current which may very well be the case with a current ramp. As an alternative to the two methods, current limiting can be used exclusively for control so that the circuit does not have to take account of the voltage at the output. The switch element S1 is switched on as from the activation of the output until the current in the current sensor has exceeded a maximum value. Then it is switched off and switched back on again in the next period.

FIG. 4 finally shows a typical system structure for the use of electronic security circuit in accordance with the invention, with the arrows illustrating the current path at a constant load. The 0V supply for the electronic security circuits is used in this case only to supply the internal electronics. The loads are connected to 0V via separately routed lines. This connection is mostly not at the same point as the electronic security cutout. Current limiting must thus operate linearly since otherwise the pulse streams of a switched-mode system lead to uncontrolled current flows in the system and this brings about ground bounce. This ground bounce is above all the result of the inductances of the cables and lines, since large loops and thus large inductances are mostly involved.

It is noted that the inventive circuit arrangement is also suitable for detecting a wire break by on-call charging of the output capacitor C2 via a high-resistance resistor from a higher voltage (e.g. 26V). If the output increases to a value specified by the manufacturer of for example 2V above the value of the feeding source, there is certainly no load at all, whereby a wire break can be deduced. Furthermore it is conceivable to provide an analog signal as an image of the current to high resistance "protected" outputs so that the operator can uniquely measure the actual current using a voltmeter. To this end holes may be provided in the circuit board and contacting to tinned surfaces on the circuit board.

With the aid of the inventive circuit arrangement a security circuit is thus realized for a power supply feeding a DC system, which in particular represents a low-cost option for embodying an electronic security cutout in a DC output circuit of a regulated power supply.

The invention claimed is:

1. A security circuit for a power supply supplying a DC system, the security circuit being arranged at an output of the power supply, comprising:
   a switch element being provided between a positive power supply terminal of the power supply and a positive output terminal of the DC system;
   a load resistor arranged between the switch element and the positive output terminal;
   an output capacitor, wherein the output capacitor is connected to the positive output terminal on a first side and to a further output terminal on a second side, wherein the load resistor is connected to the output capacitor on the first side to the positive output terminal; and
   a control unit switching the switch element based upon a current measured in the security circuit.

2. The security circuit as claimed in claim 1, wherein the security circuit is integrated into a housing of the power supply.

3. The security circuit as claimed in claim 1, wherein the output capacitor also represents an input capacitor of the security circuit.

4. The security circuit as claimed in claim 1, wherein the security circuit is embodied as a separate module for direct connection to the power supply.

5. The security circuit as claimed in claim 1, wherein the security circuit is embodied as a separate module for a connection remote from the power supply to the power supply, a separate 0 V-line being provided as a feedback to the power supply, and filters for smoothing pulse streams being provided close to the power supply.

6. The security circuit as claimed in claim 1, further comprising:
   a microprocessor configured to control the switch element.

7. A circuit arrangement, comprising:
   a DC system;
   a power supply feeding the DC system;
   at least two security circuits, each security circuit comprising:
      a switch element being provided between a positive power supply terminal of the power supply and a positive output terminal of the DC system,
      a load resistor arranged between the switch element and the positive output terminal,
      an output capacitor, wherein the output capacitor is connected to the positive output terminal on a first side and to a further output terminal on a second side, the load resistor being connected to the output capacitor on the first side to the positive output terminal, and
      a control unit switching the switch element based upon a current measured in the security circuit, wherein the two positive output terminals of the security circuits are output channels.

8. The circuit arrangement as claimed in claim 7, further comprising:
   inputs for activating and deactivating the output channels.

9. The circuit arrangement as claimed in claim 7, further comprising:
   a single microprocessor for controlling both switch elements of the at least two security circuits.

10. The circuit arrangement as claimed in claim 7, further comprising:
    an analog circuit for controlling both switch elements of the at least two security circuits.

11. The circuit arrangement as claimed in claim 7, wherein power semiconductors and the control unit are integrated in a power ASIC.

12. A method for controlling a security circuit, comprising:
providing a security circuit, including
- a switch element being provided between a positive power supply terminal of a power supply and a positive output terminal of a DC system,
- a load resistor arranged between the switch element and the positive output terminal,
- an output capacitor, wherein the output capacitor is connected to the positive output terminal on a first side and to a further output terminal on a second side, the load resistor being connected to the output capacitor on the first side to the positive output terminal, and
- a control unit switching the switch element based upon a current measured in the security circuit;

predetermining a rated current value; and
actuating the switch element only after a predetermined period for which a current is below the predetermined rated value.

13. The method as claimed in claim 12, further comprising:
predetermining a current-limiting value exceeding the rated current value; and
deactivating the positive output terminal after a predetermined time of the current-limiting value being exceeded in the security circuit.

14. The method as claimed in claim 12, further comprising:
providing a threshold for an input voltage of the security circuit; and
deactivating the positive output terminal when the input voltage of the security circuit falls below the threshold.

* * * * *